United States Patent
Choi et al.

(10) Patent No.: US 8,709,623 B2
(45) Date of Patent: *Apr. 29, 2014

(54) SECONDARY BATTERY PACK INCLUDING INSULATIVE MOUNTING MEMBER INTO WHICH PCM IS INSERTED IN LATERAL DIRECTION

(71) Applicant: LG Chem, Ltd., Seoul (KR)

(72) Inventors: Jong Woon Choi, Cheongju-si (KR); Ju Hwan Baek, Cheongwon-gun (KR); Jin Hyun Ryu, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,381

(22) Filed: Nov. 21, 2012

(65) Prior Publication Data

US 2013/0084472 A1    Apr. 4, 2013

Related U.S. Application Data

(63) Continuation of application No. PCT/KR2011/008488, filed on Nov. 9, 2011.

(30) Foreign Application Priority Data

Dec. 2, 2010  (KR) .................. 10-2010-0122325

(51) Int. Cl.
*H01M 2/34* (2006.01)
*H01M 10/04* (2006.01)

(52) U.S. Cl.
USPC ............................................. 429/7

(58) Field of Classification Search
USPC ............................................. 429/7
See application file for complete search history.

(56) References Cited

U.S. PATENT DOCUMENTS

| 6,893,753 B2 | 5/2005 | Iwaizono et al. | |
|---|---|---|---|
| 2005/0112456 A1 | 5/2005 | Kozu et al. | |
| 2009/0317715 A1 | 12/2009 | Jung et al. | |
| 2011/0273807 A1 | 11/2011 | Kim et al. | |
| 2012/0040209 A1* | 2/2012 | Baek et al. | 429/7 |
| 2012/0276420 A1* | 11/2012 | Baek et al. | 429/7 |

FOREIGN PATENT DOCUMENTS

| KR | 10-0585379 B1 | 5/2006 |
|---|---|---|
| KR | 10-0585382 B1 | 5/2006 |
| KR | 10-2008-0036253 A | 4/2008 |
| KR | 10-0888283 B1 | 3/2009 |
| KR | 10-2010-0041439 A | 4/2010 |

OTHER PUBLICATIONS

International Search Report issued PCT/KR2011/008488, mailed on Apr. 17, 2012.

* cited by examiner

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed is a secondary battery pack including a battery cell having an electrode assembly of a cathode/separator/anode structure disposed in a battery case together with an electrolyte in a sealed state, the battery case being provided at an upper end thereof with a first electrode terminal, a second electrode terminal, and a pair of fastening grooves, a protection circuit module (PCM) including a protection circuit board (PCB) having a protection circuit formed thereon, connection members A and B connected to the first electrode terminal and the second electrode terminal, respectively, and a safety element, an insulative mounting member, and an electrically insulative top cap.

15 Claims, 3 Drawing Sheets

SECONDARY BATTERY PACK INCLUDING INSULATIVE MOUNTING MEMBER INTO WHICH PCM IS INSERTED IN LATERAL DIRECTION

CROSS REFERENCE TO RELATED APPLICATIONS

This application is a Continuation of PCT International Application No. PCT/KR2011/008488 filed on Nov. 9, 2011, which claims priority under 35 U.S.C. §119(a) to Patent Application No. 10-2010-0122325 filed in the Republic of Korea on Dec. 2, 2010, all of which are hereby expressly incorporated by reference into the present application.

TECHNICAL FIELD

The present invention relates to a secondary battery pack having a novel structure, and, more particularly, to a secondary battery pack including a battery cell having an electrode assembly of a cathode/separator/anode structure disposed in a battery case together with an electrolyte in a sealed state, the battery case being provided at an upper end thereof with a first electrode terminal, a second d electrode terminal, and a pair of fastening grooves, a protection circuit module (PCM) including a protection circuit board (PCB) having a protection circuit formed thereon, connection members A and B connected to the first electrode terminal and the second electrode terminal, respectively, and a safety element, an insulative mounting member configured to have a structure in which the PCM is inserted into the insulative mounting member in a lateral direction while an upper end and a lower end of the PCM are surrounded by the insulative mounting member, and an electrically insulative top cap mounted to an upper end of the battery cell while the top cap surrounds the insulative mounting member, the top cap being provided with through holes communicating with the fastening grooves, wherein fastening members are coupled into the fastening grooves of the battery cell through the through holes of the top cap in a state in which the insulative mounting member, in which the PCM is fitted, and the top cap are loaded on the upper end of the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are connected to a battery cell.

Generally, the PCM is connected to the battery cell via conductive nickel plates by welding or soldering. That is, the nickel plates are connected to electrode tabs of the PCM by welding or soldering, and then the nickel plates are connected to corresponding electrode terminals of the battery cell by welding or soldering. In this way, the PCM is connected to the battery cell to manufacture a battery pack.

It is necessary for the safety elements, including the PCM, to be maintained in electrical connection with the electrode terminals of the battery cell and, at the same time, to be electrically isolated from other parts of the battery cell. Consequently, an insulation tape is generally bonded to the PCM excluding electrode terminal connection portions thereof to maintain electrical insulation, thereby achieving such connection.

In this case, however, it is difficult for the safety elements to rapidly sense the temperature of the battery cell due to the insulation tape, and, in addition, mechanical strength of the safety elements against external impact is low.

Also, if a plurality of insulative mounting members or a plurality of parts is used to solve the above-mentioned problems, a battery pack assembly process is complicated. When a large number of welding or soldering processes are carried out to configure the battery pack, the welding or soldering processes must be carried out with high precision because of the small structure of the secondary battery. As a result, a defect rate is high.

Therefore, there is a high necessity for a technology that is capable of stably coupling members mounted to the upper end of a battery cell and, at the same time, of simplifying an assembly process and rapidly sensing the temperature of the battery cell using safety elements, thereby improving safety of the battery cell.

DISCLOSURE

Technical Problem

Therefore, the present invention has been made to solve the above problems, and other technical problems that have yet to be resolved.

Specifically, it is an object of the present invention to provide a secondary battery pack having a stable assembly structure obtained using a simplified assembly process while maintaining mechanical strength and electrical insulation.

It is another object of the present invention to provide a secondary battery pack wherein the temperature of a battery cell is immediately sensed using safety elements, thereby improving safety of the battery cell.

Technical Solution

In accordance with one aspect of the present invention, the above and other objects can be accomplished by the provision of a secondary battery pack including a battery cell having an electrode assembly of a cathode/separator/anode structure disposed in a battery case together with an electrolyte in a sealed state, the battery case being provided at an upper end thereof with a first electrode terminal, a second electrode terminal, and a pair of fastening grooves, a protection circuit module (PCM) including a protection circuit board (PCB) having a protection circuit formed thereon, connection members A and B connected to the first electrode terminal and the second electrode terminal, respectively, and a safety element, an insulative mounting member configured to have a structure in which the PCM is inserted into the insulative mounting member in a lateral direction while an upper end and a lower end of the PCM are surrounded by the insulative mounting member, and an electrically insulative top cap mounted to an upper end of the battery cell while the top cap surrounds the insulative mounting member, the top cap being provided with through holes communicating with the fastening grooves, wherein fastening members are coupled into the fastening grooves of the battery cell through the through holes of the top cap in a state in which the insulative mounting member, in which the PCM is fitted, and the top cap are loaded on the upper end of the battery cell.

That is, in the secondary battery pack according to the present invention, the PCM is fitted in the insulative mounting member, thereby maintaining an electrically insulated state of the secondary battery pack and improving mechanical strength of the secondary battery pack.

The "lateral direction" means a direction parallel to the major axis of the PCM when the PCM has the major axis and the minor axis on the plane. Therefore, "inserted in the lateral direction" means that the PCM is inserted into the insulative mounting member in a state in which the insulative mounting member is in parallel to the major axis of the PCM. Consequently, a structure in which the PCM is insulated from the battery cell can be achieved through a simple assembly process, and the structure in which the PCM is inserted into the insulative mounting member is very stable.

It is necessary for the battery case to be easily processed and to exhibit a predetermined degree of mechanical strength. Consequently, the battery case may be a metal container. Preferably, the battery case is an aluminum container or a stainless steel container.

In a preferred example, the first electrode terminal may be a cathode terminal, and the second electrode terminal may be an anode terminal. For example, a prismatic battery cell may be configured to have a structure in which an electrode terminal protruding from the top of the battery cell and a battery case constitute an anode terminal and a cathode terminal, respectively, and an insulating member, such as a gasket, is disposed between the electrode terminal protruding from the top of the battery cell and the battery case, thereby achieving insulation therebetween. In such a prismatic battery cell, therefore, the first electrode terminal may be the top of the battery case, i.e. the cathode terminal, and the second electrode terminal may be the anode terminal protruding from the top of the battery case.

The fastening grooves may be provided at opposite sides of the upper end of battery case. One of the fastening grooves may be formed at the first electrode terminal, or both of the fastening grooves may be formed at the first electrode terminal.

The coupling (electrical connection) between the connection member A and the PCB may be achieved using various methods. Preferably, the connection member A is coupled to the bottom of the PCB by soldering.

In a concrete example, the PCM may be inserted into an opening of the insulative mounting member in a state in which electrode terminal connection portions of the connection members A and B are exposed downward, and the connection members A and B may be bent such that the PCM is mounted to the battery cell.

Consequently, the PCM, excluding the connection members A and B, is loaded on the battery cell in a state in which the PCM is electrically insulated by the insulative mounting member, thereby improving electrical and mechanical stability of the battery pack.

In another concrete example, the connection member A may be coupled to the bottom of the PCB in a state in which the connection member A protrudes from one end of the PCB through the opening of the insulative mounting member in a transverse direction, and the connection member B may be electrically connected to the second electrode terminal of the battery cell via the safety element in a state in which a second electrode terminal connection portion of the connection member B is located at the bottom of the PCB. In this structure, the connection member B, which is included in the PCM together with the safety element, is coupled to the second electrode terminal of the battery cell by welding to achieve electrical connection therebetween in a state in which the connection member B is disposed in the insulative top cap, and the connection member B is bent and mounted to the upper end of the battery cell.

In a preferred example, the safety element may be an element, the resistance of which increases with the increase of temperature. Preferably, the safety element is a positive temperature coefficient (PTC) element. The connection member B coupled to the PTC element serves to interrupt current at the upper end of the battery pack when the temperature of the battery pack abruptly rises due to an internal short circuit or the like. However, the safety element is not limited to the PTC element. For example, a bimetal or a fuse may be used as the safety element.

In particular, in the secondary battery pack according to the present invention, the insulative mounting member may be configured to have a step so that at least a portion of the safety element is exposed. Consequently, the remaining portions, excluding the electrode terminal connection portions of the insulative mounting member and the safety element, are insulated from the outside by the insulative mounting member. Since the safety element exposed from the insulative mounting member toward the battery cell more sensitively responds to the temperature of the battery cell, thereby improving safety of the secondary battery pack. More preferably, the safety element is fully exposed from the insulative mounting member.

The materials composing the connection member A and the connection member B are not particularly restricted so long as the connection member A and the connection member B are formed of conductive materials. Preferably, the connection member A and the connection member B are formed of nickel plates.

Various kinds of fastening members coupled into the fastening grooves of the battery cell through the through holes of the top cap may be used. For example, the fastening members may be screws; however, the fastening members are not limited thereto.

The coupling of the top cap to the upper end of the battery cell is achieved through the above-described coupling method, thereby securing a stably coupled state of the battery pack.

In a state in which the fastening members are inserted through the through holes, an adhesive may be applied into internal surplus regions of the through holes. Preferably, sealing members are inserted into the internal surplus regions of the through holes. An example of each of the sealing members may be a rubber stopper. However, the sealing members are not limited thereto.

In addition to the insulative top cap coupled to the upper end of the battery cell, an insulative bottom cap may be mounted to the lower end of the battery cell. A sheathing film may be attached to the outside of the battery case. Consequently, it is possible to protect the battery cell from external impact and to maintain an electrically insulated state of the battery pack.

In the secondary battery pack according to the present invention, any battery cells may be used in various manners irrespective of the kind and shape of the battery cells. A prismatic lithium secondary battery cell is preferably used.

In accordance with another aspect of the present invention, there is provided a protection circuit module (PCM) assembly mounted to a battery cell having an electrode assembly of a cathode/separator/anode structure disposed in a battery case together with an electrolyte in a sealed state, the battery case being provided at an upper end thereof with a first electrode terminal and a second electrode terminal, the PCM assembly including a PCM including a protection circuit board (PCB) having a protection circuit formed thereon, connection members A and B to be connected to the first electrode terminal and the second electrode terminal, respectively, and a safety element, an insulative mounting member configured to have a structure in which the PCM is inserted into the insulative mounting member in a lateral direction in a state in which the upper end and the lower end of the PCM are surrounded by the insulative mounting member, and an electrically insulative top cap mounted to an upper end of the battery cell while the insulative mounting member is disposed in the top cap, the top cap being provided with through holes communicating with the fastening grooves, wherein fastening members are coupled into the fastening grooves of the battery cell through the through holes of the top cap in a state in which the insulative mounting member, in which the PCM is fitted, and the top cap are loaded on the upper end of the battery cell.

In a general process of assembling a battery pack, the connection members and the PCM are sequentially coupled to or loaded on the battery cell, and the top cap is mounted to the battery cell in a state in which an insulative tape is attached. In this way, the PCM assembly is mounted to the battery cell. Consequently, it is not possible to obtain high mechanical strength, and an assembly process is complicated. In the PCM assembly according to the present invention, on the other hand, the insulative mounting member, in which the PCM is fitted, and the top cap are mounted to the battery cell by fastening using the fastening members in a state in which the insulative mounting member and the top cap are loaded on the battery cell, thereby solving the above-mentioned problems.

The PCM assembly is new in the art to which the present invention pertains.

In accordance with a further aspect of the present invention, there is provided a method of manufacturing a secondary battery pack, including (a) coupling a connection member B to one side of a safety element, (b) coupling the other side of the safety element to a bottom of a protection circuit board (PCB) having a protection circuit formed thereon, (c) coupling a connection member A to the bottom of the PCB in a state in which the connection member A protrudes from one end of the PCB in a transverse direction to manufacture a protection circuit module (PCM), (d) inserting the PCM into an insulative mounting member configured so that a first electrode terminal connection portion of the connection member A and a second electrode terminal connection portion of the connection member B are opened, (e) disposing the PCM in an insulative top cap, (f) coupling the connection member B to the second electrode terminal by welding, bending the connection member B, and mounting the top cap to an upper end of a battery cell, (g) fastening the top cap to the battery cell through screw coupling to achieve electrical connection and mechanical coupling between the first electrode terminal and the connection member A, (h) coupling an insulative bottom cap a lower end of the battery cell using an adhesive, (i) injecting an adhesive or inserting a sealing member into a through holes of the top cap, through which a screw is inserted, and (j) covering an outside of the battery pack with a sheathing film.

As compared with a conventional method of manufacturing a secondary battery pack, therefore, it is possible to manufacture a battery pack exhibiting greatly improved mechanical strength and stability.

Of course, some processes may be omitted from this manufacturing method or other processes may be additionally added to this manufacturing method as needed based on the level of those skilled in the art.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
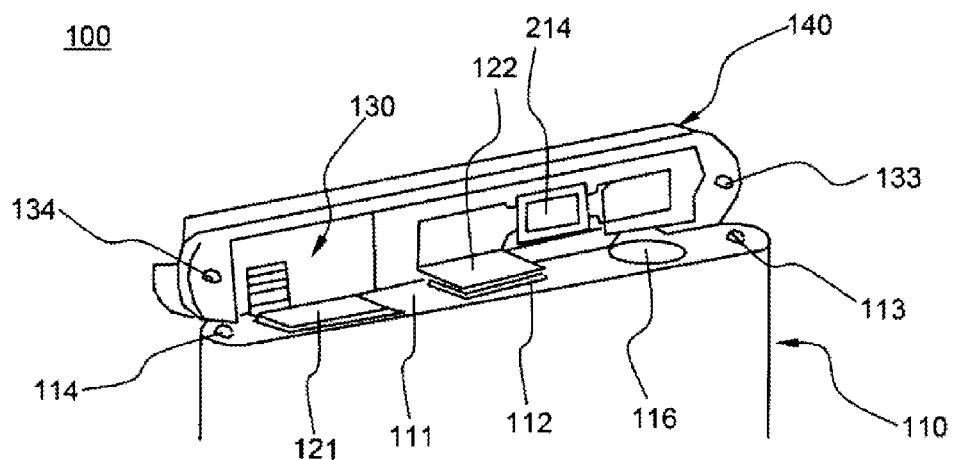
FIG. 1 is a partial perspective view showing the upper end of a battery cell according to an embodiment of the present invention and an insulative top cap on which an insulative mounting member is loaded.
Figure 2:
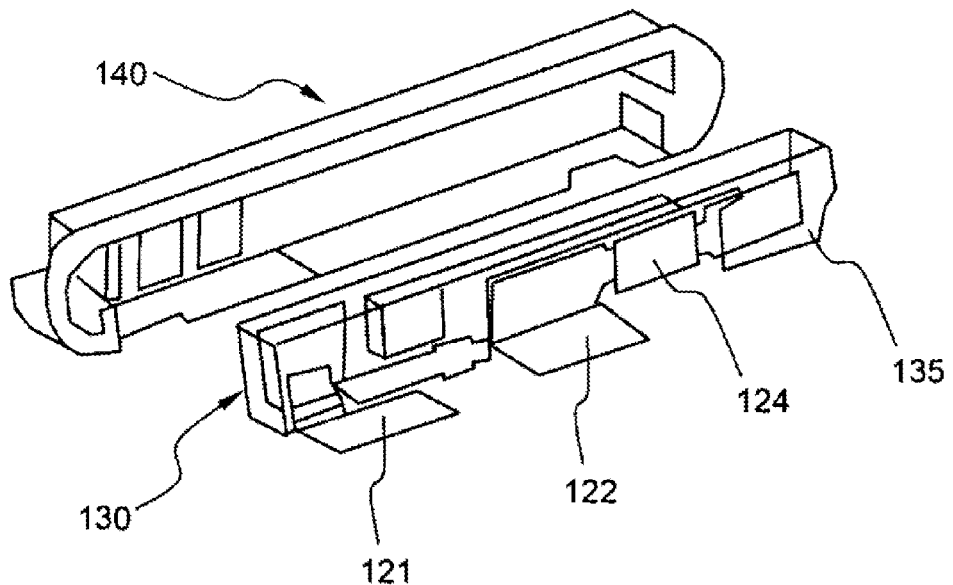
FIG. 2 is an exploded perspective view showing the insulative mounting member, in which a protection circuit module (PCM) is fitted, and the insulative top cap.
Figure 3:
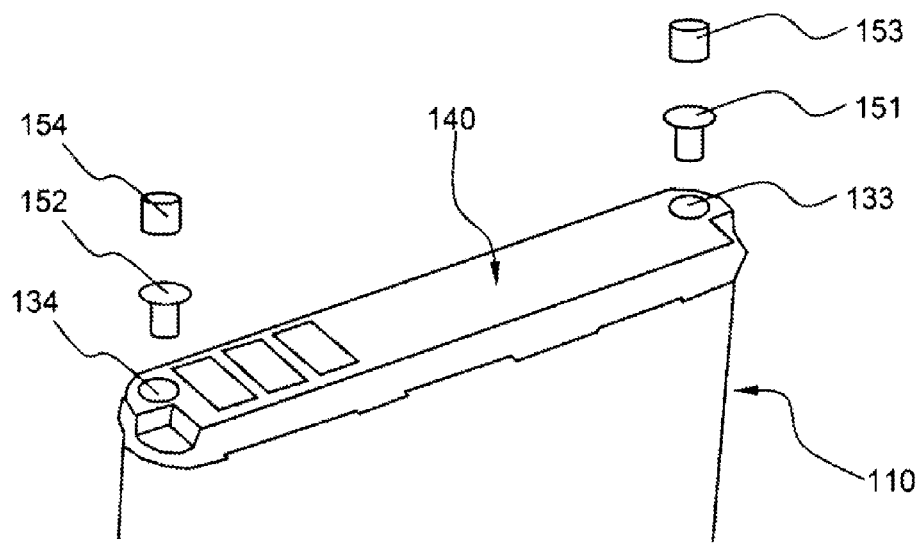
FIG. 3 is a typical view showing the insulative top cap mounted to the upper end of the battery cell and fastening members.
Figure 4:
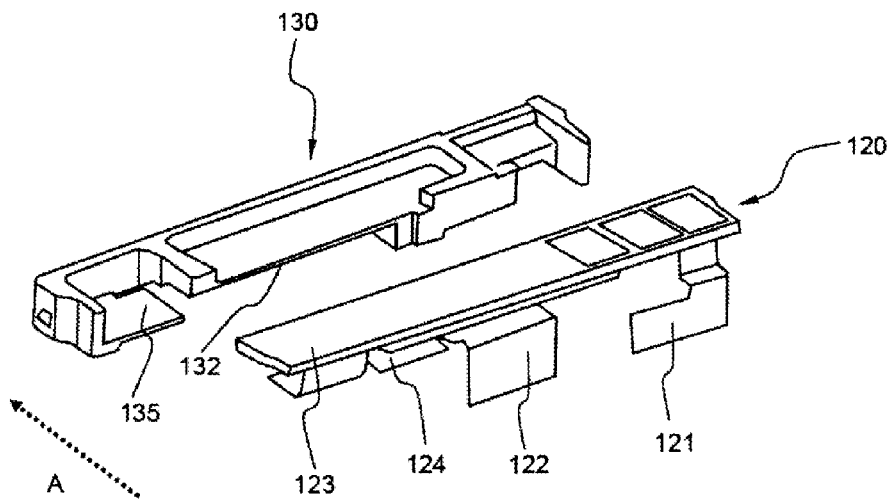
FIG. 4 is an exploded perspective view showing the PCM and the insulative top cap of FIG. 2.

FIG. 1 is a partial perspective view showing the upper end of a battery cell according to an embodiment of the present invention and an insulative top cap on which an insulative mounting member is loaded, FIG. 2 is an exploded perspective view showing a protection circuit module (PCM) and the insulative mounting member, FIG. 3 is a typical view showing the insulative top cap mounted to the upper end of the battery cell and fastening members, and FIG. 4 is an exploded perspective view showing the PCM and the insulative top cap of FIG. 2.

Referring to FIG. 1, a secondary battery pack 100 is configured to have a structure including a battery cell 110, a protection circuit module (PCM) 120, an insulative mounting member 130, in which the PCM 120 is fitted, and a top cap 140 mounted to the upper end of the battery cell 110 in a state in which the top cap 140 surrounds the insulative mounting member 130.

The battery cell 110 is configured to have a structure in which an electrode assembly is disposed in a battery case together with an electrolyte in a sealed state, and a cathode terminal 111, an anode terminal 112 and a pair of fastening grooves 113 and 114 are formed at the upper end of the battery case.

The PCM 120 includes a protection circuit board (PCB) 123 having a protection circuit formed thereon, connection members 121 and 122 connected to the cathode terminal 111 and the anode terminal 112, respectively, and a positive temperature coefficient (PTC) element 124.

The insulative mounting member 130 is configured to have a structure in which the PCM 120 is inserted into the insulative mounting member 130 in the lateral direction (a direction indicated by an arrow in FIG. 4) in a state in which the upper end and the lower end of the PCM 120 are surrounded by the insulative mounting member 130.

The top cap 140 is formed of an electrically insulative material. The top cap 140 is provided at opposite sides thereof with through holes 133 and 134, which communicate with the fastening grooves 113 and 114, respectively.

The battery cell 110 is provided at the top thereof with the anode terminal 112, which protrudes upward in a state in which the anode terminal 112 is insulated from the battery case, which is formed of a metal container. The remaining region of the top of the battery cell 110 excluding the anode terminal 112 constitutes the cathode terminal 111. The battery cell 110 is provided at one side of the top thereof with an electrolyte injection port 116, which is sealed by a metal ball and a polymer resin.

In a state in which the insulative mounting member 130, in which the PCM 120 is fitted, and the top cap 140 are loaded on the upper end of the battery cell 110, therefore, the fastening members 151 and 152 are coupled into the fastening grooves 113 and 114 of the battery cell 110 through the through holes 133 and 134 of the top cap 130, respectively, and sealing members 153 and 154 are inserted into internal surplus regions of the through holes 133 and 134, respectively. In this way, mechanical coupling between the battery cell 110, the insulative mounting member 130 and the top cap 140 is achieved.

Figure 5:
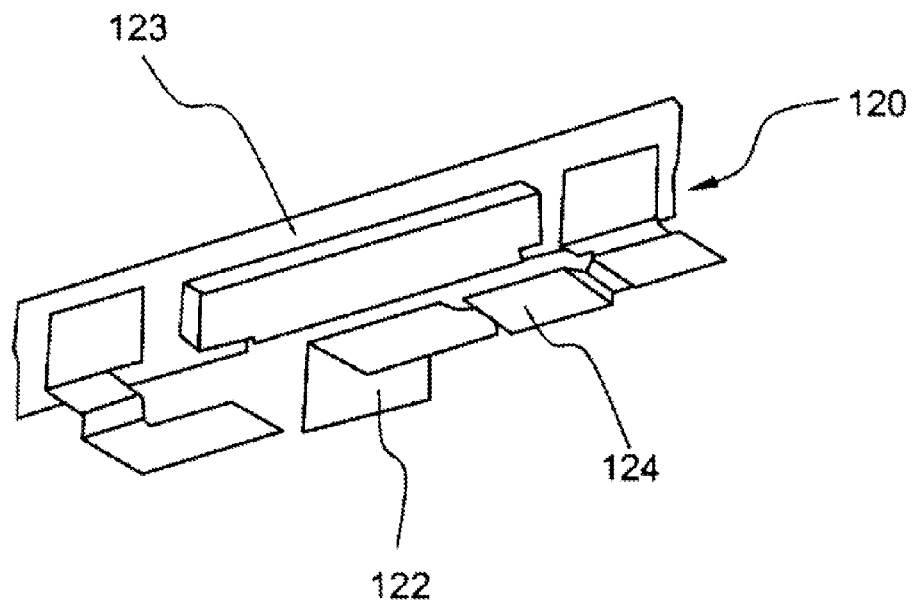
FIG. 5 is a perspective view showing connection members A and B and a positive temperature coefficient (PTC) element coupled to the bottom of a protection circuit board (PCB)

FIG. 5 is a perspective view showing connection members A and B and the PTC element coupled to the bottom of the PCB.

Referring to FIG. 5 together with FIGS. 1 and 3, the insulative mounting member 130 is provided at one side thereof with an opening 132, through which the PCM 120 is inserted into the insulative mounting member 130 in the lateral direction. Consequently, the PCM 120 is inserted into the insulative mounting member 130 in the lateral direction in a state in which electrode terminal connection portions of the connection member A 121 and the connection member B 122 are exposed, and the connection member A 121 and the connection member B 122 are bent and mounted to the upper end 11 of the battery cell 111 in a state in which the PCM 120 is fitted in the insulative mounting member 130. Also, the lower end of the insulative mounting member 130 is configured to have a step 135. Consequently, the PTC element 124 can be directly exposed to the battery cell 100.

Since the insulative mounting member 130 is mounted to the battery cell 110 in a state in which the PCM 120 is fitted in the insulative mounting member 130, therefore, the overall mechanical strength of the secondary battery pack is improved, and the secondary battery pack has a stable structure. Also, the PTC element 124 sensitively responds to heat generated from the battery cell 110, thereby improving safety of the secondary battery pack.

The connection member A 121 is coupled to the bottom of the PCB 123 in a state in which the connection member A 121 protrudes from one end of the PCB 123 through the opening 132 of the insulative mounting member 130 in the transverse direction.

The connection member B 122 is electrically connected to the anode terminal 112 of the battery cell via the PTC element 124 in a state in which the anode terminal connection portion of the connection member B 122 is located at the bottom of the PCB 123.

Figure 6:
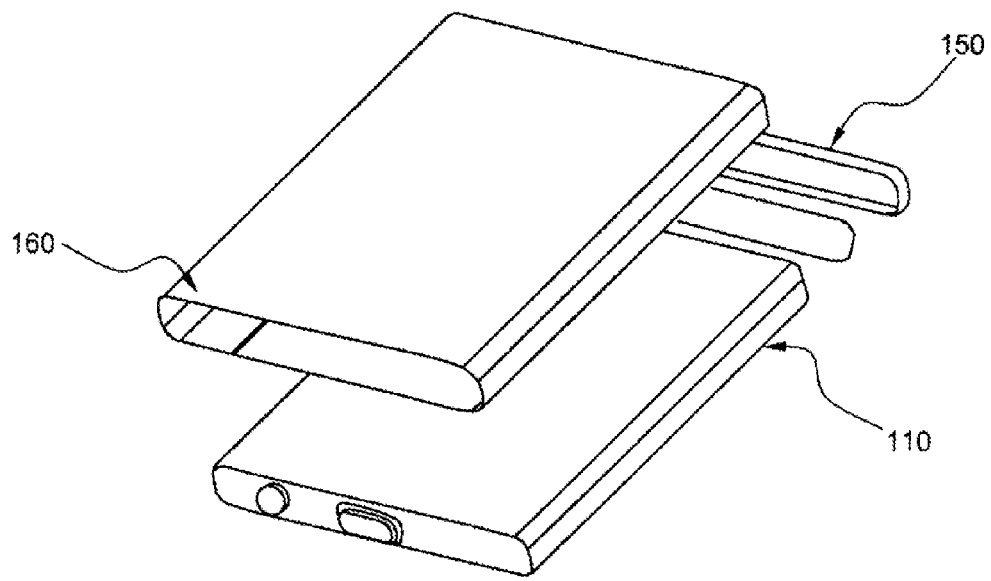
FIG. 6 is an exploded perspective view showing the battery cell, an insulative bottom cap, and a sheathing film.

FIG. 6 is an exploded perspective view showing the battery cell, an insulative bottom cap, and a sheathing film.

Referring to FIG. 6, the secondary battery pack is configured to have a structure including an insulative bottom cap 150 coupled to the lower end of the battery cell 110 and a sheathing film 160 attached to the outside of the battery case of the battery cell 110 so as to cover the outside of the case of the battery cell 110.

The sheathing film 160, which displays product information while maintaining an electrically insulated state at the outside of the battery case, is formed of a thermally shrinkable material. The sheathing film 160 is configured in the form of a tube, which surrounds the battery cell 110, is shrunk by heat applied to the tube, and comes into tight contact with the outside of the battery case of the battery cell 110

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, it is possible to manufacture a secondary battery pack according to the present invention through a simple process of inserting a PCM into an insulative mounting member based on a specific structure of the insulative mounting member.

The invention claimed is:

1. A secondary battery pack comprising:
  a battery cell having an electrode assembly of a cathode/separator/anode structure disposed in a battery case together with an electrolyte in a sealed state, the battery case being provided at an upper end thereof with a first electrode terminal, a second electrode terminal, and a pair of fastening grooves;
  a protection circuit module (PCM) comprising a protection circuit board (PCB) having a protection circuit formed thereon, connection members A and B connected to the first electrode terminal and the second electrode terminal, respectively, and a safety element, in which the connection members and the safety element are connected to the protection circuit board;
  an insulative mounting member configured to have a structure in which the insulative mounting member is provided at one side thereof with an opening, in which a surface of the PCM facing an electrically insulative to cap is encapsulated by the insulative mounting member except for terminal portions, through which the PCM is inserted into the insulative mounting member in a lateral direction while an upper end and a lower end of the PCM are surrounded by the insulative mounting member; and
  the electrically insulative top cap mounted to an upper end of the battery cell while the top cap surrounds the insulative mounting member, the top cap being provided with through holes communicating with the fastening grooves, wherein
  fastening members are coupled into the fastening grooves of the battery cell through the through holes of the top cap in a state in which the insulative mounting member, in which the PCM is fitted, and the top cap are loaded on the upper end of the battery cell.

2. The secondary battery pack according to claim 1, wherein the battery case is a metal container.

3. The secondary battery pack according to claim 1, wherein the first electrode terminal is a cathode terminal, and the second electrode terminal is an anode terminal.

4. The secondary battery pack according to claim 1, wherein the fastening grooves are provided at opposite sides of the upper end of battery case.

5. The secondary battery pack according to claim 1, wherein the connection member A is coupled to a bottom of the PCB by soldering.

6. The secondary battery pack according to claim 1, wherein the PCM is inserted into the opening of the insulative mounting member in a state in which electrode terminal connection portions of the connection members A and B are exposed downward, and the connection members A and B are bent such that the PCM is mounted to the battery cell.

7. The secondary battery pack according to claim 1,
wherein the connection member A is coupled to a bottom of the PCB in a state in which the connection member A protrudes from one end of the PCB through the opening of the insulative mounting member in a transverse direction, and
the connection member B is electrically connected to the second electrode terminal of the battery cell via the safety element in a state in which a second electrode terminal connection portion of the connection member B is located at a bottom of the PCB.

8. The secondary battery pack according to claim 1, wherein the safety element is a positive temperature coefficient (PTC) element.

9. The secondary battery pack according to claim 1, wherein the insulative mounting member is configured to have a step so that at least a portion of the safety element is exposed.

10. The secondary battery pack according to claim 1, wherein the connection member A and the connection member B are formed of nickel plates.

11. The secondary battery pack according to claim 1, wherein the fastening members are screws.

12. The secondary battery pack according to claim 11, wherein sealing members are further disposed in the through holes, through which the fastening members are inserted so as to be fastened to the battery cell.

13. The secondary battery pack according to claim 1, wherein a sheathing film is attached to an outside of the battery case.

14. The secondary battery pack according to claim 1, wherein the battery cell is a prismatic lithium secondary battery cell.

15. A protection circuit module (PCM) assembly mounted to a battery cell having an electrode assembly of a cathode/separator/anode structure disposed in a battery case together with an electrolyte in a sealed state, the battery case being provided at an upper end thereof with a first electrode terminal, a second electrode terminal and a pair of fastening grooves, the PCM assembly comprising:
a PCM comprising a protection circuit board (PCB) having a protection circuit formed thereon, connection members A and B to be connected to the first electrode terminal and the second electrode terminal, respectively, and a safety element, in which the connection members and the safety element are connected to the protection circuit board;
an insulative mounting member configured to have a structure in which the insulative mounting member is provided at one side thereof with an opening, in which a surface of the PCM facing an electrically insulative to cap is encapsulated by the insulative mounting member except for terminal portions, through which the PCM is inserted into the insulative mounting member in a lateral direction while an upper end and a lower end of the PCM are surrounded by the insulative mounting member; and
the electrically insulative top cap mounted to an upper end of the battery cell while the insulative mounting member is disposed in the top cap, the top cap being provided with through holes communicating with the fastening grooves, wherein
fastening members are coupled into the fastening grooves of the battery cell through the through holes of the top cap in a state in which the insulative mounting member, in which the PCM is fitted, and the top cap are loaded on the upper end of the battery cell.

* * * * *